UNITED STATES PATENT OFFICE.

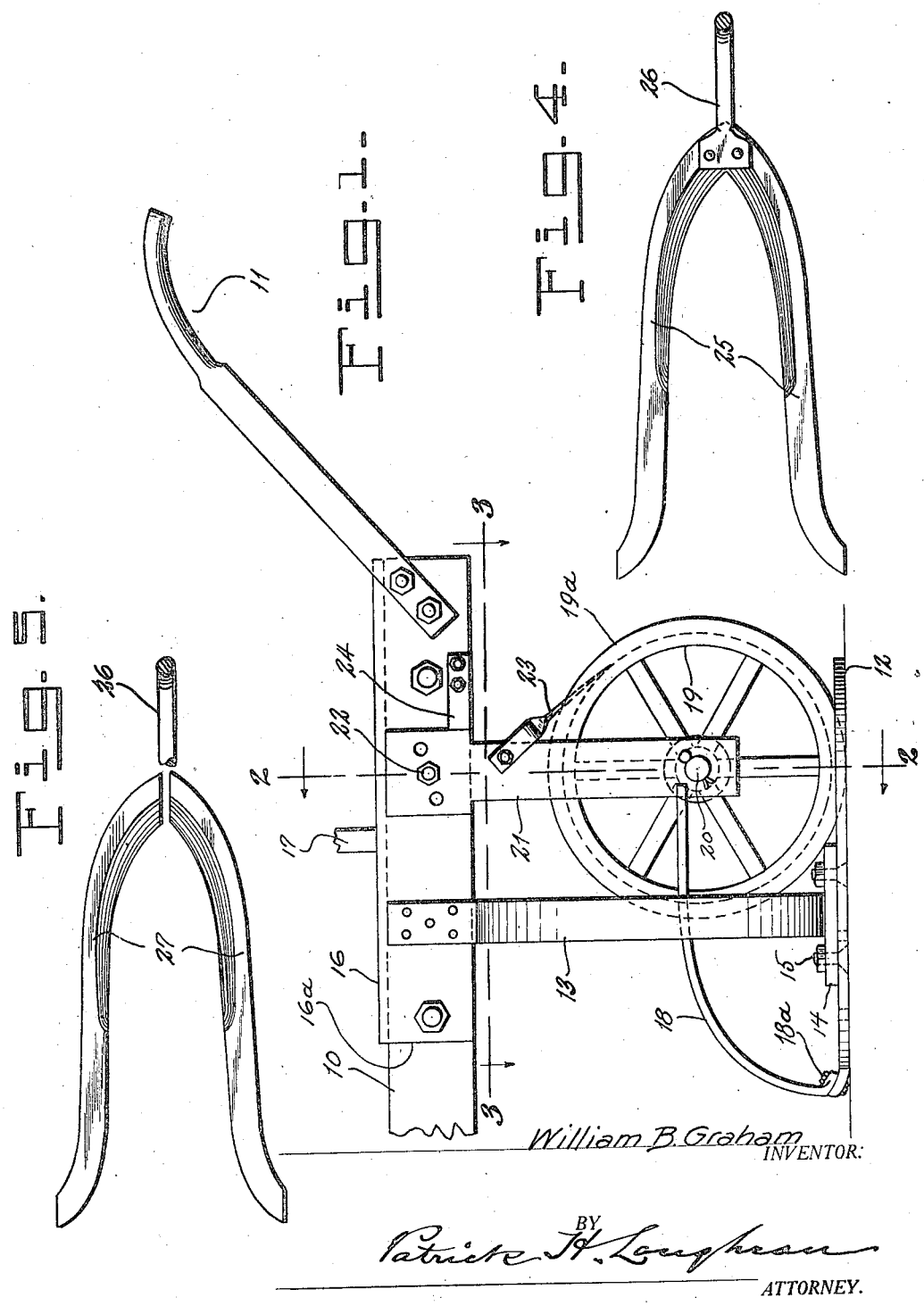

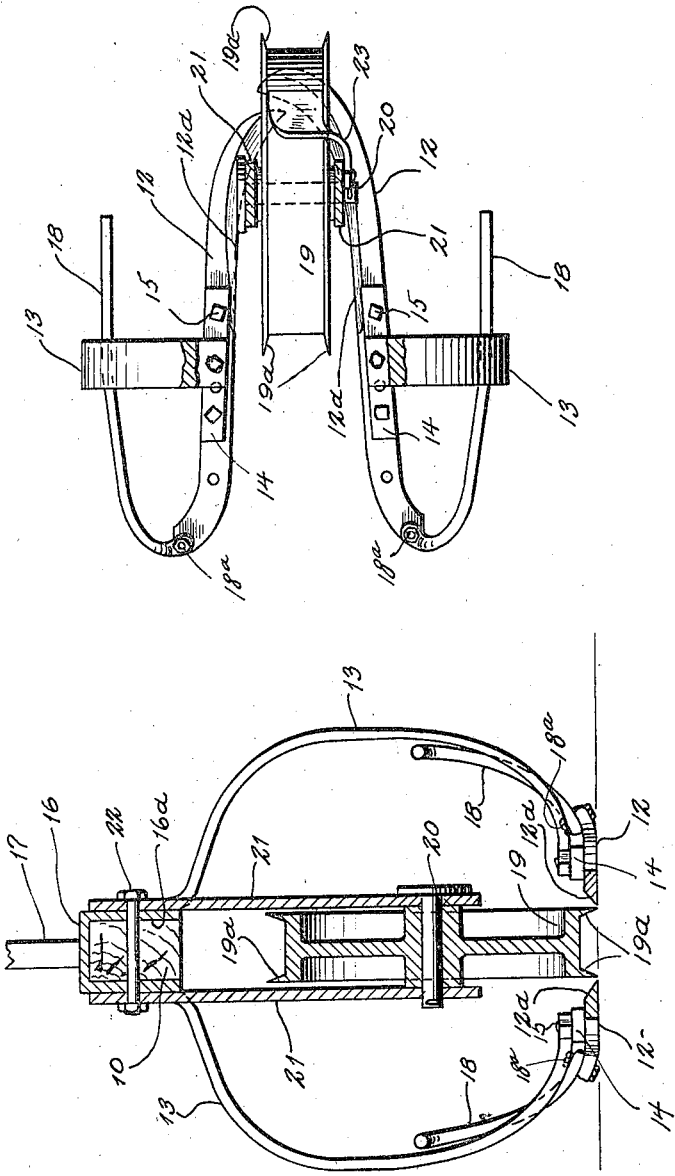

WILLIAM B. GRAHAM, OF DEAVER, WYOMING.

VEGETABLE-TOPPING MACHINE.

1,380,647.　　　　Specification of Letters Patent.　　Patented June 7, 1921.

Application filed August 6, 1920. Serial No. 401,599.

*To all whom it may concern:*

Be it known that I, WILLIAM B. GRAHAM, a citizen of the United States, residing at Deaver, in the county of Bighorn and State of Wyoming, have invented certain new and useful Improvements in Vegetable-Topping Machines, of which the following is a specification.

This invention relates to implements for topping vegetables, and while designed more particularly for topping beets on the field, it may be employed for topping other vegetables.

The invention has for its object to provide a very simple and efficient topping implement of the kind stated, and to this end it consists in a novel combination and arrangement of parts to be hereinafter described and claimed.

In order that the invention may be better understood, reference is had to the accompanying drawings forming a part of this specification, and in said drawings—

Figure 1 is a side elevation of the implement; Fig. 2 is a cross section on the line 2—2 of Fig. 1; Fig. 3 is a horizontal section on the line 3—3 of Fig. 1, and Figs. 4 and 5 are plan views showing different forms of topping knives.

Referring specifically to the drawings, 10 denotes a wooden or other beam equipped at its rear end with handles 11 for guiding the implement. The beam 10 may be connected to a beet cultivator or other wheeled implement; but may also be used alone. When used alone, the beam 10 will be provided with front supporting wheels, the same not being shown as their use is well understood. When the implement is attached to a cultivator or other wheeled support, several topping units may be used to operate simultaneously on a corresponding number of rows.

The topping device comprises a pair of laterally spaced knives 12 which are set horizontally to operate with a draw cut, their cutting edges $12^a$ facing each other and being arranged to converge rearwardly. As shown in Fig. 3, the rear ends of the knives 12 curve inwardly so that the rear extremity of one knife is back of the other. The purpose of the gap between the rear ends of the knives is to let dried or very tough parts of the beet tops slip by so that the knives will not be clogged up.

Each knife 12 is supported by a hanger bar 13 extending downward from the side of the beam 10 with an outward curve at the top and an inward curve at the bottom, as clearly shown in Fig. 2 of the drawings. To the bottom of the bar 13 is riveted or otherwise secured a footpiece 14 to which the knife is secured by bolts 15, the heads of the latter being countersunk in the knife, and the latter being on the bottom of the footpiece. The knife has a plurality of bolt holes for the bolts 15 so that it may be adjusted in the direction of the length of the implement.

On the beam 10 is mounted, and secured in any suitable manner, a cap piece 16 having side flanges $16^a$ fitting the sides of the beam, to which flanges the hanger bars 13 are riveted or otherwise fastened. The cap piece 16 also has an upstanding stem 17 for connection of the implement to the beam of a cultivator if it is to be attached to the same.

Associated with each knife 12 is a foliage lifting and guiding arm 18 which is bolted or otherwise secured to the forward end of the knife as shown at $18^a$. From the point of its attachment, the arm has an upward and rearward bend as clearly shown in Figs. 1 and 3 so that it terminates near the rear end of the knife, outward of the same, and above the plane thereof. The rearward bend of the arm 18 also passes the hanger bar 13 on the inside thereof.

At 19 is shown a gage wheel to automatically maintain the proper depth at which the knives 12 operate. The rim of this wheel has one or more peripheral cutting ribs $19^a$ running entirely around the same. As shown in Fig. 3, the wheel is positioned between the knives 12, the rear inwardly extending portions of the latter being a sufficient distance to the rear of the wheel where it trails on the ground or over the beet crowns, so that the knives 12 and the cutting edges of the ribs $19^a$ do not interfere with each other.

The wheel 19 runs free on an axle 20 supported by hanger bars 21 carried by and depending from the beam cap flanges $16^a$. The fastening for the hanger bars is a bolt 22 passing through the beam 10 and the cap flanges $16^a$. One of the bars 21 carries a scraper 23 for keeping the wheel 19 free of dirt and trash. The upper ends of the hanger bars 21 are shown provided with a plurality of bolt holes (see Fig. 1) for the bolt 22, to enable the gage wheel 19 to be adjusted forwardly or rearwardly, and properly set relative to the knives 12, and these bolt holes run on a slant so that a certain vertical adjustment of the gage wheel is also rendered possible.

The wheel 19 acts as a gage for the knives 12, and it also serves to guide the implement and to prevent it from slipping sidewise.

To the rear of the hanger bars 21, the flanges 16ª carry brace pieces 24 abutting thereagainst to assist in holding the same.

Fig. 4 shows topping knives 25 slightly different from the knives 12, said knives 25 being joined at their rear ends and here supported by a bracket member 26. Fig. 5 shows knives 27 similar to the knives 25 and supported by a similar bracket member 26, but having their rear ends spaced to provide a gap for the same purpose as the gap at the rear ends of the knives 12.

In operation, the implement is drawn along the rows of beets to be topped, and it is guided so that the beets enter between the knives 12. The cutting edges 12ª do not extend up to the forward ends of the knives, the latter being here blunt and having upturned extremities as shown in Fig. 1 to act as runners riding on the ground alongside the row of beets and coming beneath the foliage. The arms 18 gather the foliage and crowd it between the bars 13 toward the center of the row to come between the knives 12, and when the beets reach the rear ends of the latter the cutting edges 12ª act with a draw cut to sever the tops. The wheel 19 rides over the crowns of the beets, which are split by the cutting ribs 19ª entering the same, and the tops are cut off by the knives 12 at a depth corresponding to the depth of the cutting ribs 19ª, the cutting edges 12ª being on the same level, or substantially so, as the cutting edges of said ribs. The knives 12 rise and fall with the wheel 19 as the latter rides over the beet crowns, and hence the beets are all topped uniformly, the depth at which the cut is made corresponding to the depth of the cutting ribs 19ª of the wheel 19.

The implement is very simple in construction, and easily operated, and it effectually serves the purpose for which it is designed.

I claim:

1. A vegetable cutter comprising a pair of laterally spaced topping knives having their cutting edges facing each other, a gage wheel running between the cutting portions of the knives and having peripheral ribs which are sharp to produce cutting edges, the level of said cutting edges coinciding with the level of the cutting edges of the knives, and a supporting means for the knives and the gage wheel.

2. A vegetable cutter comprising a pair of laterally spaced topping knives having their cutting edges facing each other, a gage wheel running between the cutting portions of the knives and having peripheral ribs which are sharp to produce cutting edges, the level of said cutting edges coinciding with the level of the cutting edges of the knives, the rear ends of the knives being inturned to come behind the ground-engaging portion of the gage-wheel, and a supporting means for the knives and the gage wheel.

3. A vegetable cutter comprising a pair of laterally spaced topping knives having their cutting edges facing each other, a gage wheel running between the cutting portions of the knives and having peripheral ribs which are sharp to produce cutting edges, the level of said cutting edges coinciding with the level of the cutting edges of the knives, a beam, and supporting means for the knives and the gage wheel, said supporting means being carried by the beam.

4. A vegetable cutter comprising a pair of laterally spaced topping knives having their cutting edges facing each other, a gage wheel running between the cutting portions of the knives and having peripheral ribs which are sharp to produce cutting edges, the level of said cutting edges coinciding with the level of the cutting edges of the knives, a beam, and supporting means for the knives and the gage wheel, said supporting means being carried by the beam, the supporting means of the gage wheel being adjustable vertically and also longitudinally of the beam, and the knives being adjustable in the direction of their length.

In testimony whereof I affix my signature.

WILLIAM B. GRAHAM.